Aug. 30, 1932.　　　S. N. TIDEMAN　　　1,875,282
METERING DEVICE
Filed June 23, 1930　　2 Sheets-Sheet 1
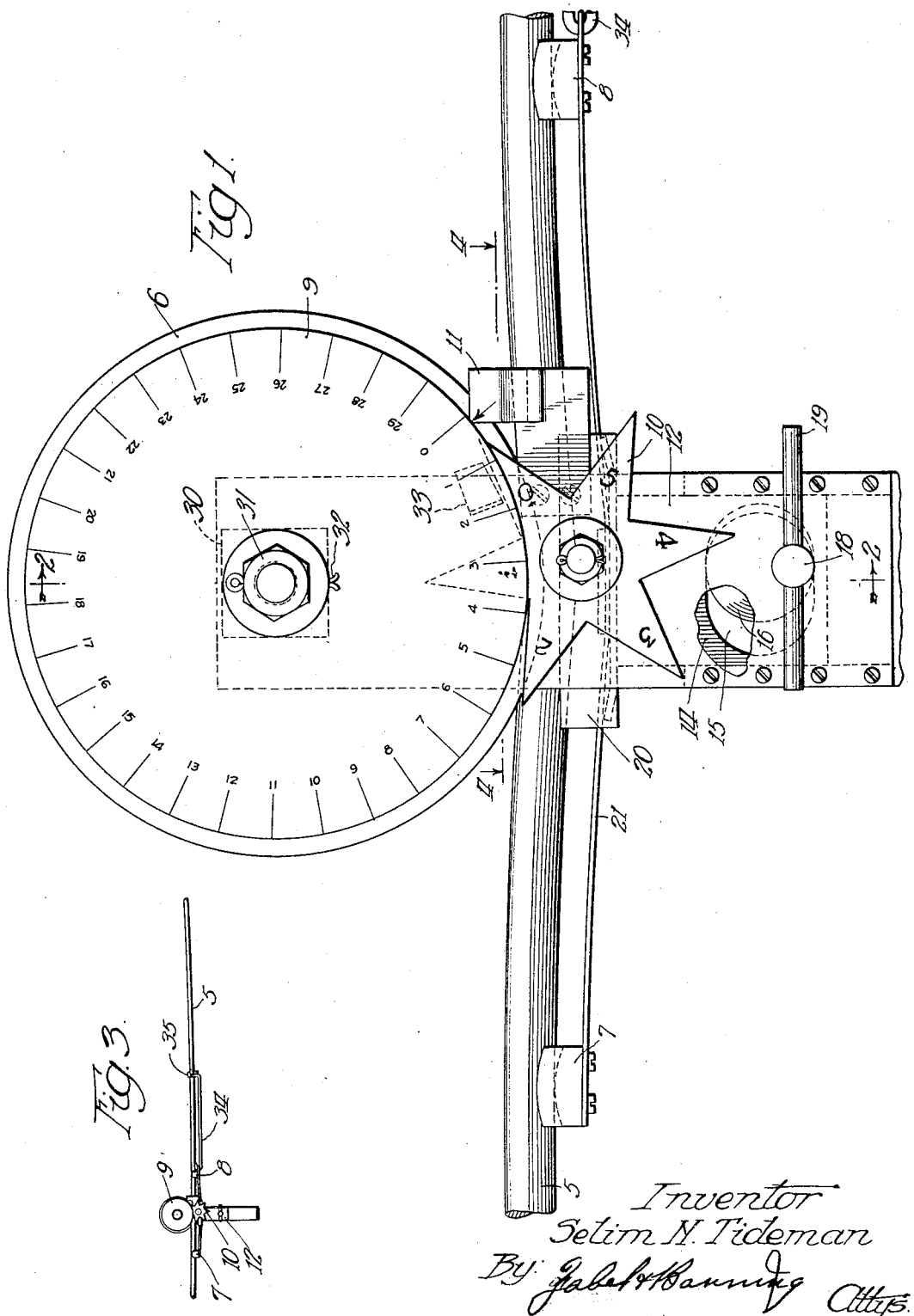

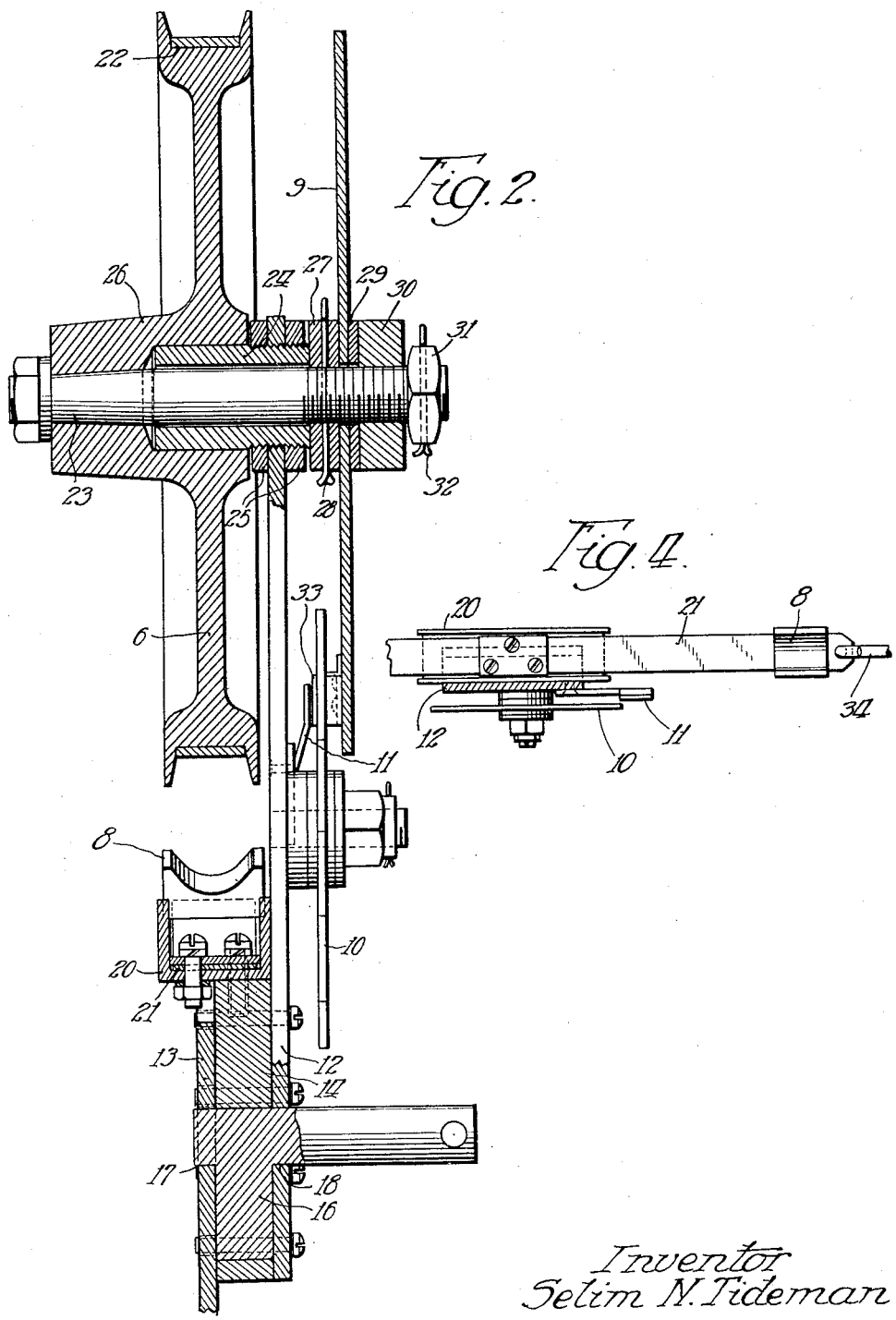

Patented Aug. 30, 1932

1,875,282

UNITED STATES PATENT OFFICE

SELIM N. TIDEMAN, OF WILMETTE, ILLINOIS

METERING DEVICE

Application filed June 23, 1930. Serial No. 463,223.

My invention relates to metering devices for measuring lengths of cable.

My device is particularly adapted for use in conjunction with the application of supporting rods between a messenger cable and trolley wire and installations such for instance as overhead contact wires for electric railway systems.

In these systems, the trolley which must be substantially the same elevation from the track throughout its length is carried by a messenger cable which is suspended from suitable supports such as poles, towers, and the like spaced at suitable intervals apart. The supporting connection between the messenger cable and the trolley cable is usually made by means of catenary rods, so called, these rods being cut to the proper length and applied at certain spaced distances according to the requirements of the particular installation.

My present invention is very useful in measuring on the messenger cable the length or distance between adjacent catenary rods. For example, if a certain span between two supporting towers or poles were to have the catenary rods provided one every sixteen feet, my metering device can be set so that it will indicate by merely running the same along the testing cable the distance traversed by the metering device, and in this way the points of sixteen feet apart may be accurately established directly on the messenger cable.

The principal purpose of this invention, therefore, is to provide in a device of this character a measuring wheel together with means for maintaining a non-slipping connection between this wheel and the messenger cable to be measured in combination with means to accurately indicate the number of revolutions of the wheel and thereby indicate the distance the wheel has traversed.

Another object of the invention is to provide a device of this character which will be self-supporting upon the messenger cable so that it need not be held in position by the operator when he is measuring off the positions for the catenary rod.

Other and more specific objects of the invention will appear as the description proceeds when taken in connection with the accompanying drawings. It is to be understood, however, that the disclosure is illustrative only and is not to be taken as limiting the invention except in so far as it is limited by the claims.

In the drawings—

Fig. 1 is a side view of the device showing it mounted on a cable to be measured;

Fig. 2 is a section on the line 2—2 of Fig. 1;

Fig. 3 is a small detailed view showing the manner in which the device may be moved along the cable; and Fig. 4 is a section on the line 4—4 of Fig. 1.

Referring now in detail to the drawings, I show at 5 the messenger cable which is to be marked or otherwise measured for the application of the supporting catenary rods thereto. My improved metering device consists of a wheel 6 adapted to rest upon the cable and free to rotate as it is moved along the cable without any slippage between it and the cable. Cooperating with the wheel are suitable clamping elements 7 and 8 adapted to yieldingly force the wheel into engagement with the cable and thus prevent slippage as well as to prevent the wheel from becoming detached once it is applied to the cable. Also rotating with the wheel is an indicating disk 9 which cooperates with the counting element 10 and an indicating pointer 11 to indicate the number of revolutions made by the wheel and thus through the knowledge of the circumference of the wheel to indicate the distance of travel of the wheel along the cable.

All of the mechanism is mounted on a suitable frame-piece 12 which as shown has fixed thereon a cooperating frame-piece 13, these two frame-pieces forming a guideway for the sliding block 14 which is provided with a suitable opening 15 adapted to receive the cam 16.

This cam 16 is provided with suitable bearing projections for instance at 17 and 18 whereby it is supported by the frame members 12 and 13 for rotation. The projecting end 18 of the cam shaft is provided with a suitable handle 19 by means of which it may be rotated to move the block 14 upwardly and downwardly. Block 14 carries a channel shaped member 20 in which there is secured the connecting bar 21 which connects the supports 7 and 8. This bar is preferably made of spring steel so that the normal position of the members 7 and 8 when not applied to a cable would be considerably above the position as shown in Fig. 1. However, the spring 21 permits yielding of these members as the cam 16 moves the block 14 upwardly so that the effect is to merely get a strong tension bracing the wheel against the cable to prevent slippage.

The wheel which is preferably cork lined as indicated at 22 is fixedly mounted upon a suitable spindle 23 by forcing it into the tapered opening in hub 26. The spindle passes through the sleeve 24 that is fixed upon the frame piece 12. As shown, the sleeve 24 is held rigidly in position by being screw threaded in the member 12 and held thereto by means of a pair of lock nuts 25. The exterior of sleeve 24 is, of course, the bearing surface for the hub 26 of the wheel. Spindle 23 at its end opposite the hub 26 has fixed thereon a nut or washer 27 which preferably is screw threaded on the spindle and then held in place by a suitable cotter pin 28. The indicating disk 9 is then clamped against the nut 27 by means of a suitable washer 29 and a nut 30 that can be tightened up or loosened as desired, the entire assembly being locked on the spindle 23 by means of the nut 31 and cotter pin 32.

This makes it possible by the mere loosening of nut 30 to adjust the indicating dial 9 at any time thus making it unnecessary to rotate the wheel to bring the starting indication of the disk 9 to zero position. Upon tightening of nut 30, disk 9 will be held rigidly against rotation relative to the wheel. The indicating disk 9 is preferably divided, for a wheel having thirty inches circumference, into thirty equal divisions so that each division on the disk represents an inch of cable length.

Now in order to keep track of the number of revolutions made by the disk 9, I mount upon the frame 12 a counting element 10 which is in the form of a star having a number of points, this star being held by suitable nuts and washers so as to resist rotation with a slight amount of friction sufficient to hold it in any position except when force is applied thereto. This member 10 lies between the frame 12 and the disk 9 in the path of a suitable lug 33 mounted on the disk 9 and adapted to engage with the points of the member 10. Thus, upon each revolution of the member 9, this projection 33 will engage one of the points of the member 10 and move the member 10 thru a distance equal to one-sixth of a revolution, and the member 10 will therefore complete one revolution for six complete revolutions of the member 9. The points of the star 10 are numbered as shown or otherwise suitably marked so that the operator may count the revolutions of member 9 thereon. The frame 12 also carries an indicating pointer 11 the purpose of which is merely to indicate the starting position or zero position upon the indicating disk 9.

The operation of the device in measuring distance between catenary rods would be as follows:

With the cam 16 in the position shown in Fig. 2, that is in position to move the block 14 to its lowermost position, the metering device would be set on the cable and then the handle 19 turned so as to clamp the cable between the wheel 6 and the members 7 and 8. Assuming that this was done at the point from which the measurement should be started, the disk 9 would then be loosened and turned so that the zero mark coincided with the pointer member 11, whereupon the member would again be down in position so as to rotate with the wheel 6. Then the metering device would be pushed along the cable, and, at each rotation of the wheel, the member 9 would move the star 10 one step in its rotation. With the present form, the complete rotation of the star 10 would give six times thirty or one hundred eighty inches, the distance of fifteen feet, between adjacent catenary rods, and this point could be marked to indicate the setting of the rod for example by painting a mark upon the messenger cable.

I might at this time describe a simple contrivance which I use in connection with this metering device to aid in marking. This is simply a wire or rod, shown in Fig. 3 at 34 as attached to the end of the spring 21 adjacent the member 8. This rod is then provided with a hook at 35 which hooks over the cable 5 a couple of feet or so distant from the metering device. Now it can readily be seen that if hook 35 is placed up against the support when the metering device is started in operation, the position of the hook 35 after six revolutions of the wheel 6 would be fifteen feet from the supporting post, and a paint mark placed at the hook 35 or a rod secured thereto would be in proper position if the catenary rods were to be placed fifteen feet apart. The wheel could then be slid along farther until another complete revolution of the star 10 were made at which position another rod should be attached. In this manner, the correct positioning of the catenary rods is easily accomplished.

It is also obvious that where the spacing needs to be varied, that is by making a longer space than usual, the setting of the disk 9 at zero to begin with makes it possible to read off the exact inches over and above a definite amount, as, for an example, suppose that it was desired to set the rods sixteen and one-half feet apart at one point, at one point the wheel would be rotated six times and then continued on until the numeral eighteen on the disk 9 registered with the pointer on the member 11 at which point the distance of sixteen and one-half feet would have been measured off.

From the above description, it is thought that the construction and operation of this device will be clear to those skilled in this art; and, having thus described my invention, what I claim as new and desire to secure by Letters Patent is:

1. A metering device for suspended cables and the like comprising in combination a measuring wheel adapted to ride on the cable and having a peripheral groove for receiving the cable, a spindle fixed to said wheel, a bearing sleeve, said wheel having a central recess in which said sleeve is rotatably received, a member fixed to said sleeve and depending therefrom at one side of said wheel, said spindle passing through said sleeve and member, a dial secured to said spindle on the opposite side of said member from said wheel, said member having laterally extending arms mounted thereon below said wheel, said arms having cable seating portions at their free ends.

2. A metering device for suspended cables and the like comprising in combination a measuring wheel adapted to ride on the cable and having a peripheral groove for receiving the cable, a spindle fixed to said wheel, a bearing sleeve, said wheel having a central recess in which said sleeve is rotatably received, a member fixed to said sleeve and depending therefrom at one side of said wheel, said spindle passing through said sleeve and member, a dial secured to said spindle on the opposite side of said member from said wheel, said member having laterally extending arms mounted thereon below said wheel, said arms having cable seating portions at their free ends, said member having means thereon for pressing said cable seating portions up against a cable upon which said wheel is riding.

3. A metering device for suspended cables and the like comprising in combination a measuring wheel adapted to ride on the cable and having a peripheral groove for receiving the cable, a spindle fixed to said wheel, a bearing sleeve, said wheel having a central recess in which said sleeve is rotatably received, a member fixed to said sleeve and depending therefrom at one side of said wheel, said spindle passing through said sleeve and member, a dial secured to said spindle on the opposite side of said member from said wheel, said member having laterally extending arms mounted thereon below said wheel, said arms having cable seating portions at their free ends, said member having a rotatable counter mounted thereon, and said dial having means thereon engaging said counter during a small portion only of each rotation of said dial to thereby change the indication of said counter.

4. A metering device for suspended cables and the like comprising in combination a measuring wheel adapted to ride on the cable and having a peripheral groove for receiving the cable, a spindle fixed to said wheel, a bearing sleeve, said wheel having a central recess in which said sleeve is rotatably received, a member fixed to said sleeve and depending therefrom at one side of said wheel, said spindle passing through said sleeve and member, a dial secured to said spindle on the opposite side of said member from said wheel, said member having laterally extending arms mounted thereon below said wheel, said arms having cable seating portions at their free ends, said dial being adjustable about said spindle to vary its angular position with respect to said wheel.

5. A metering device for suspended cables and the like comprising in combination a measuring wheel adapted to ride on the cable and having a peripheral groove for receiving the cable, a spindle fixed to said wheel, a bearing sleeve, said wheel having a central recess in which said sleeve is rotatably received, a member fixed to said sleeve and depending therefrom at one side of said wheel, said spindle passing through said sleeve and member, a dial secured to said spindle on the opposite side of said member from said wheel, said member having laterally extending arms mounted thereon below said wheel, said arms having cable seating portions at their free ends, one of said arms having a rod pivoted thereto, and said rod having a hook at its free end for riding on the cable.

In witness whereof, I hereunto subscribe my name this 5th day of June, A. D., 1930.

SELIM N. TIDEMAN.